United States Patent [19]

Hisanaga et al.

[11] Patent Number: 5,076,099

[45] Date of Patent: Dec. 31, 1991

[54] ZERO POINT COMPENSATING CIRCUIT

[75] Inventors: Tetsuo Hisanaga, Yokohama; Shigeru Aoshima, Chigasaki, both of Japan

[73] Assignee: Yamatake-Honeywell Co. Ltd., Tokyo, Japan

[21] Appl. No.: 564,535

[22] Filed: Aug. 7, 1990

[30] Foreign Application Priority Data

Aug. 7, 1989 [JP] Japan ................................. 1-202924

[51] Int. Cl.$^5$ ............................................... G01F 1/68
[52] U.S. Cl. ........................................ 73/204.18; 73/3
[58] Field of Search .................... 73/3, 204.11, 204.16, 73/204.18, 204.19

[56] References Cited

U.S. PATENT DOCUMENTS 3,891,391 6/1975 Boone ................................. 73/204.18
4,682,496 7/1987 Miura et al. ........................ 73/204.16

*Primary Examiner*—Herbert Goldstein
*Attorney, Agent, or Firm*—Whitham & Marhoefer

[57] ABSTRACT

A zero point compensating circuit for a microbridge flow meter including an upstream thermal sensor means, a downstream thermal sensor means and a heater means located between said upstream and downstream thermal sensor is provided which comprises a first switch coupled to said heater for turning on and off the same and a current supply circuit coupled to said upstream and downstream thermal sensors for selectively supplying the same with a first current when said first switch is closed and a second current larger than said first current when said first switch is opened such that said upstream and downstream thermal sensors reach a temperature to which they are heated when said heater is on in no flow condition. Thus, an offset caused by discrepancy in the resistance value and thermal coefficients of resistance (TCR) of the upstream and downstream temperature sensors can be removed by the above circuit, thereby making it possible to achieve a precise measurement of small flow rates of a fluid of interest.

4 Claims, 5 Drawing Sheets

FLOW RATE

ZERO POINT COMPENSATING CIRCUIT

BACKGROUND OF THE INVENTION

1. Field of the Invention

This invention relates to a flow meter utilizing a microbridge sensor, and more particularly directed to a zero point compensating circuit for use in such microbridge flow meter which is adapted to eliminate offsets occurring in outputs from the microbridge sensor.

2. Description of the Prior Art

A microbridge flow meter has a heater and upstream and downstream temperature sensors disposed on opposite sides of the heater provided on a bridge formed on a semiconductor substrate. The temperature sensors comprise two identical temperature sensing resistor grids $R_U$ and $R_D$ acting as thin film heat sensors, and the centrally located heater comprises a resistor grid acting as thin film heater. The temperature sensors $R_U$ and $R_D$ may be fabricated of any suitable, stable metal or alloy film, for example, permalloy. The sensor and heater grids are encapsulated in a thin film of dielectric, preferably made of silicon nitride, $Si_3N_4$, to form thin film members. The temperature sensors $R_U$ and $R_D$ are comprised in a bridge circuit as shown in FIG. 1 to derive a bridge output $V_B$.

In the microbridge flow meter thus constructed, a temperature provided by the heater and given to and sensed by the upstream temperature sensor differs from a temperature provided by the heater and given to and sensed by the downstream temperature sensor dependent upon flow rates of a fluid of interest. Thus, a flow rate is measured based on an output which is derived from the difference between temperatures sensed by the upstream and downstream temperature sensors. An increase in the flow rate causes the temperature of the upstream temperature sensor to be decreased, whereby the resistance of the sensor material is also decreased. On the contrary, the temperature of the downstream temperature sensor is increased and accordingly the resistance of the sensor material is also increased.

Preferably, the upstream and downstream temperature sensors are completely identical so as to respond temperature changes in the same manner. However, variations in physical characteristic inevitably occur in the manufacturing process. Such variations may cause a so-called offset, that is, a discrepancy between outputs from the upstream and downstream temperature sensors when there is no flow. Generally, these variations are suppressed below one per cent level of accuracy, so that the offset caused thereby is negligeable in large flow measuring applications, however, can damage precision in measurement, depending upon applications, particularly in measuring small flow rates of a fluid of interest.

To remove such offset, there are conventionally the following two methods:

1. The flow of a fluid of interest is stopped for a predetermined period for measuring and storing an output in this non-flow period, i.e., the offset value which is then subtracted from each output value upon normally measuring; and
2. A non-flow condition is virtually created without stopping the flow of a fluid of interest for measuring and storing the offset value which is then subtracted from each output value upon normally measuring.

The method 1 ensures to obtain the precise offset value, however, stoppage of flow of a fluid of interest, required by the method 1, is not always permitted.

The method 2, i.e., a virtual non-flow condition may be realized, for example, by turning off a power supply to the heater without stopping the flow.

It will be therefore noted that the method 2 is more practical than the method 1 for removing the offset.

Now, the method 2 will be hereinafter explained in more detail.

First, the resistance values of the upstream and downstream temperature sensor $R_U$, $R_D$ at a reference temperature are designated $R_{UO}$ and $R_{DO}$, respectively, and thermal coefficient of resistances (TCR) of the sensors $R_U$ and $R_D$, $\alpha U$ and $\alpha D$, respectively. Assuming that a temperature of the upstream and downstream temperature sensors $R_U$, $R_D$ when the heater is off (in virtual non-flow condition) is T1 and a temperature of the same when the heater is on (normal measuring condition) is T2, the resistance value $R_{U1}$ of the sensor $R_U$ at heater off time, the resistance value $R_{D1}$ of the sensor $R_D$ at heater off time, the resistance value $R_{U2}$ of the sensor $R_U$ at heater on time, and the resistance value $R_{D2}$ of the sensor $R_D$ are given by the following expressions (1)-(4), respectively.

$$R_{U1} = R_{UO}(1 + \alpha_U T1) \quad (1)$$
$$R_{D1} = R_{DO}(1 + \alpha_D T1) \quad (2)$$
$$R_{U2} = R_{UO}(1 + \alpha_U T2) \quad (3)$$
$$R_{D2} = R_{DO}(1 + \alpha_D T2) \quad (4)$$

In the circuit diagram of FIG. 1, it resistors R1 and R2 have the same resistance value, the bridge output $V_B$ at heat-off time ($V_{B1}$) and heat-on time ($V_{B2}$) are given as follows:

$$V_{B1} = V_S \cdot \left( \frac{R_{D1}}{R_{U1} + R_{D1}} - \frac{1}{2} \right) \quad (5)$$

$$V_{B2} = V_S \cdot \left( \frac{R_{D2}}{R_{U2} + R_{D2}} - \frac{1}{2} \right) \quad (6)$$

If $\alpha U = \alpha D$ and $R_{UO} \sim R_{DO}$ stand, bridge output $V_{B2}$ is not zero when the flow rate is zero, thus occurring offset. This offset, however, can be removed by subtracting heat-off bridge output $V_{B1}$ from heat-on bridge output $V_{B2}$.

The expression (5) is transformed by substituting the expressions (1) and (2) for $R_{U1}$ and $R_{D1}$:

$$V_{B1} = V_S \cdot \left( \frac{R_{DO} \cdot (1 + \alpha_D \cdot T1)}{R_{UO} \cdot (1 + \alpha_D T1) + R_{DO} \cdot (1 + \alpha_D \cdot T1)} - \frac{1}{2} \right) \quad (5)'$$

Also, the expression (6) is transformed by substituting the expressions (3) and (4) for $R_{U2}$ and $R_{D2}$:

$$V_{B2} = \quad (6)'$$

$$V_S \cdot \left( \frac{R_{DO} \cdot (1 + \alpha_D \cdot T2)}{R_{UO} \cdot (1 + \alpha_D \cdot T2) + R_{DO} \cdot (1 + \alpha_D \cdot T2)} - \frac{1}{2} \right)$$

Thus, $$V_{B2} - V_{B1} =$$

-continued $$V_S \cdot \left( \frac{R_{D0} \cdot (1 + a_D \cdot T2)}{R_{U0} \cdot (1 + a_U \cdot T2) + R_{D0} \cdot (1 + a_D \cdot T2)} - \frac{R_{D0} \cdot (1 + a_D \cdot T1)}{R_{U0} \cdot (1 + a_U \cdot T1) + R_{D0} \cdot (1 + a_D \cdot T1)} \right) = 0$$

It can be seen from the above expression that the offset caused by $R_{U0} \neq R_{D0}$ in the bridge output $V_{B2}$ is cancelled.

However, if $aU = aD$ does not stand in the above method of cancelling the offset by subtracting the first bridge output $V_{B1}$ from the second bridge output $V_{B2}$, the resulting value $V_{B2} - V_{B1}$ is not zero, and another offset occurs. This offset is smaller than the above-mentioned offset caused by $R_{U0} \neq R_{D0}$ in the bridge output $V_{B2}$, however, is not negligeable, particularly when small flow rates are to be measured.

OBJECTS AND SUMMARY OF THE INVENTION

In view of the above-mentioned problem, it is an object of the present invention to provide a zero point compensating circuit which can eliminate any offset and enable precise measurement of small flows.

To achieve the above object, the present invention provides a zero point compensating circuit for a flow meter of a type including an upstream thermal sensor means, a downstream thermal sensor means and a heater means located between said upstream and downstream thermal sensor means, said upstream and downstream thermal sensor means constituting a bridge circuit, and said flow meter measuring flow rates of a fluid of interest based on bridge outputs derived by the difference in temperatures sensed by said upstream and downstream thermal sensor means, said zero point compensating circuit comprising:

a first switch means coupled to said heater means for turning on and off said heater means; and a current supply means coupled to said upstream and downstream thermal sensor means for selectively supplying said upstream and downstream thermal sensor means with a first current when said first switching means is closed and a second current larger than said first current when said first switching means is opened such that said upstream and downstream thermal sensor means reach a temperature to which they are heated when said heater is on in no flow condition.

The above and other objects, features and advantages of the present invention will become apparent from the following detailed description of the preferred embodiments with reference to the accompanying drawings.

DETAILED DESCRIPTION OF THE PREFERRED EMBODIMENTS

Figure 2:
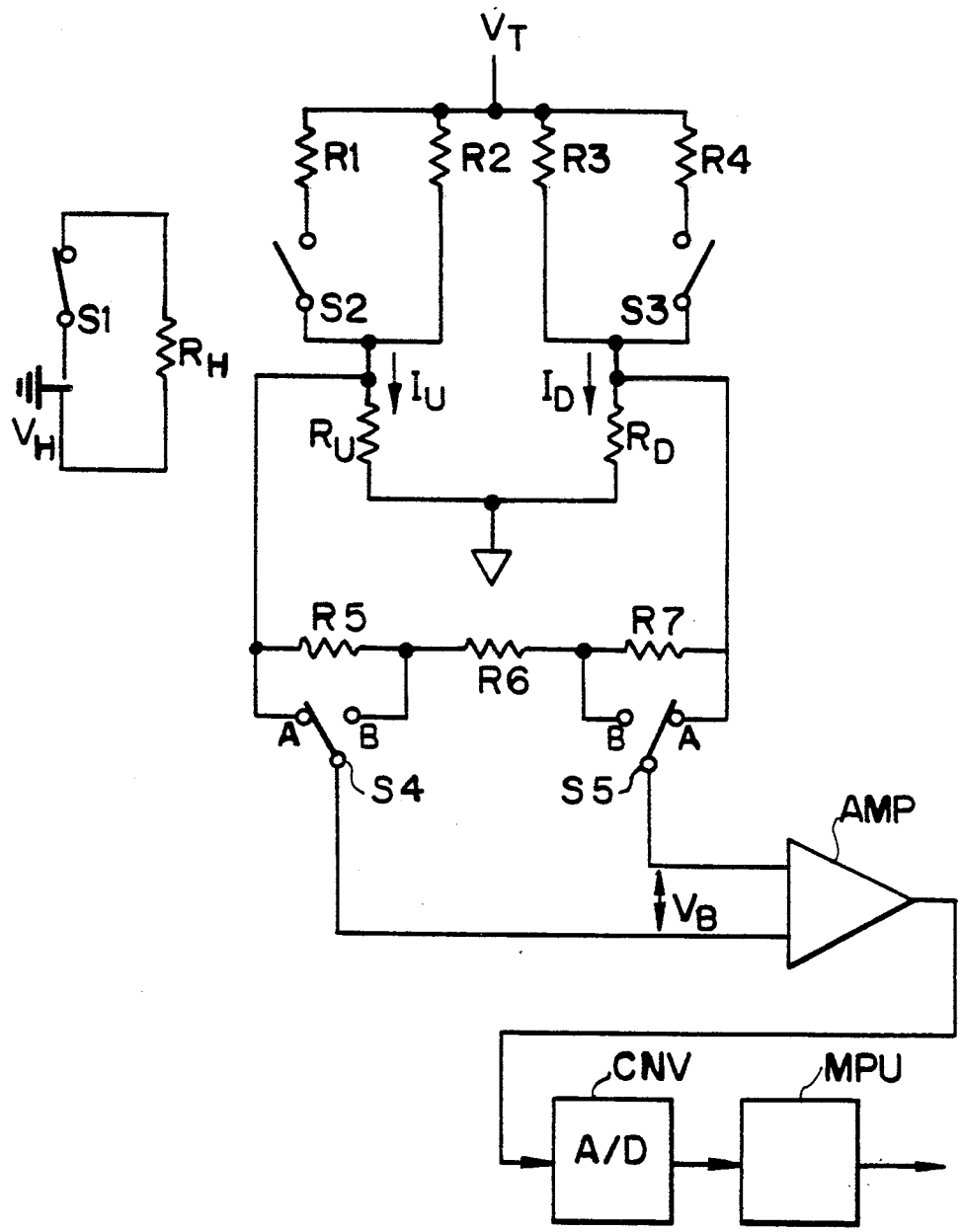
FIG. 2 is a circuit diagram showing a zero point compensating circuit according to the present invention.

FIG. 2 shows an embodiment of a zero point compensating circuit of the present invention. The circuit of FIG. 2 includes an upstream temperature sensor $R_U$, a downstream temperature sensor $R_D$ and a heater $R_H$ located between the two sensors. A switch S1 is interposed between an electrical power supply $V_H$ and the heater $R_H$ for on-off controlling a power supply to the heater $R_H$. Switches S2, S3 are turned on when the switch S1 is turned off, while switches S4, S5 are changed over to respective contacts B when the switch S1 is turned off. A differential amplifier AMP amplifies a bridge differential voltage $V_B$ (hereinafter simply called "the bridge output") derived from a bridge circuit including the upstream and downstream temperature sensing resistor grids or temperature sensors $R_U$, $R_D$. An analog amplified output from the amplifier AMP is supplied to an anglog-to-digital (A/D) converter CNV to be converted to a digital signal which in turn is supplied to a microcomputer MPU for signal processing.

Resistors R1-R7 are chosen to be sufficiently higher values than the resistance values of the upstream and downstream temperature sensors $R_U$, $R_D$. Also, resistors R1 and R4, R2 and R3 and R5 and R7 are respectively identical. Further, resistors R1, R2, R3 and R4 are determined to supply currents $I_U$, $I_D$ to the upstream and downstream temperature sensors $R_U$, $R_D$, respectively, when the heater $R_H$ is off such that a temperature at the upstream and downstream temperature sensors $R_U$, $R_D$ in no flow condition is constant irrespective of the heater $R_H$ being on or off. Specifically, when the heater $R_H$ is off, the currents $I_U$, $I_D$ supplied to the temperature sensors $R_U$, $R_D$ are increased so as to make the temperature at the temperature sensors $R_U$, $R_D$ in non-flow condition constant irrespective of on or off state of the heater $R_H$. The resistance values of the resistors R5, R6 and R7 are determined in accordance with the following expression:

$$\frac{R6}{R5 + R6 + R7} = \frac{I_{U2}}{I_{U1}} = \frac{U_{D2}}{I_{D1}}$$

where $I_{U1}$, $I_{D1}$ represent currents supplied to the upstream and downstream temperature sensors $R_U$, $R_D$, respectively, when the heater $R_H$ is off, and $I_{U2}$, $I_{D2}$ represent currents flowing the upstream and downstream temperature sensors $R_U$, $R_D$, respectively when the heater $R_H$ is on, and $I_{U1} = I_{D1}$ and $I_{U2} = I_{D2}$ are satisfied.

The resistors R5-R7 make up an attenuator for reducing the bridge output. When the heater $R_H$ is off, upstream and downstream temperature sensors $R_U$, $R_D$ are supplied with larger currents, as mentioned above, whereby the bridge output becomes larger during heater-off condition than during heater-on condition. The attenuator, formed of the resistors R5-R7, reduces the bridge output during heater-off condition to a level equal to the bridge output during heater-on condition.

In the flow meter thus constructed, the bridge output $V_{B1}$ during heater-off condition is represented by the following expression:

$$V_{B1} = \frac{R6}{R5 + R6 + R7} \cdot (I_{D1} \cdot R_{D1} - I_{U1} \cdot R_{U1})$$

Also, the bridge output $V_{B2}$ during heater-on condition is represented by the following expression:

$$V_{B2} = I_{D2} \cdot R_{D2} - I_{U2} \cdot R_{U2}$$

Now, assuming that $R_{UO} \neq R_{DO}$ and $\alpha U \neq \alpha D$ stand, the bridge output $V_{B2}$ in non-flow conditions is not zero due to the offset. However, in the present embodiment, this offset can be removed by subtracting the heater-off bridge output $V_{B1}$ from the heater-on bridge output $V_{B2}$ by the microcomputer MPU. This event will be proved herebelow.

When no flow exists, $R_{U1}$, $R_{D1}$, $R_{U2}$ and $R_{D2}$ are respectively given by:

$$R_{U1} = R_{U0} \cdot (1 + \alpha_U \cdot T1)$$
$$R_{D1} = R_{D0} \cdot (1 + \alpha_D \cdot T1)$$
$$R_{U2} = R_{U0} \cdot (1 + \alpha_U \cdot T2)$$
$$R_{D2} = R_{D0} \cdot (1 + \alpha_D \cdot T2)$$

Thus, $V_{B2} - V_{B1} = I_{D2} \cdot R_{D2} - I_{U2} \cdot R_{U2} -$ $$\frac{R6}{R5 + R6 + R7} \cdot (I_{D1} \cdot R_{D1} - I_{U1} \cdot R_{U1}) =$$

$$I_{U2} \cdot [R_{D0} \cdot (1 + \alpha_D \cdot T2) - R_{U0} \cdot (1 + \alpha_U \cdot T2)] -$$

$$\frac{R6}{R5 + R6 + R7} \cdot I_{U1} \cdot [R_{D0} \cdot (1 + \alpha_D \cdot T1) - R_{U0} \cdot (1 + \alpha_U \cdot T1)] = I_{U2} \cdot [R_{D0} \cdot (1 + \alpha_D \cdot T2) - R_{U0} \cdot (1 + \alpha_U \cdot T2)] -$$

$$\frac{I_{U2}}{I_{U1}} \cdot I_{U1} \cdot [R_{D0} \cdot (1 + \alpha_D \cdot T1) - R_{U0} \cdot (1 + \alpha_U \cdot T1)] =$$

$$I_{U2} \cdot [R_{D0} \cdot \alpha_D \cdot (T2 - T1) - R_{U0} \cdot \alpha_U \cdot (T2 - T1)]$$

When the heater $R_H$ is off, the currents $I_{U1}$, $I_{D1}$ flowing the upstream and downstream temperature sensors $R_U$, $R_D$ are increased to be more than the heater-on currents $I_{U2}$, $I_{D2}$, whereby temperatures of the the upstream and downstream temperature sensors $R_U$, $R_D$ are elevated by heat generated by the currents $I_{U1}$, $I_{D1}$ such that the heat-off temperature T1 at non flow condition becomes equal to the heat-on temperature T2 at non flow condition. Therefore, $V_{B2} - V_{B1}$ becomes zero, i.e., the offset occurring in the bridge output $V_{B2}$ is removed.

Figure 3:
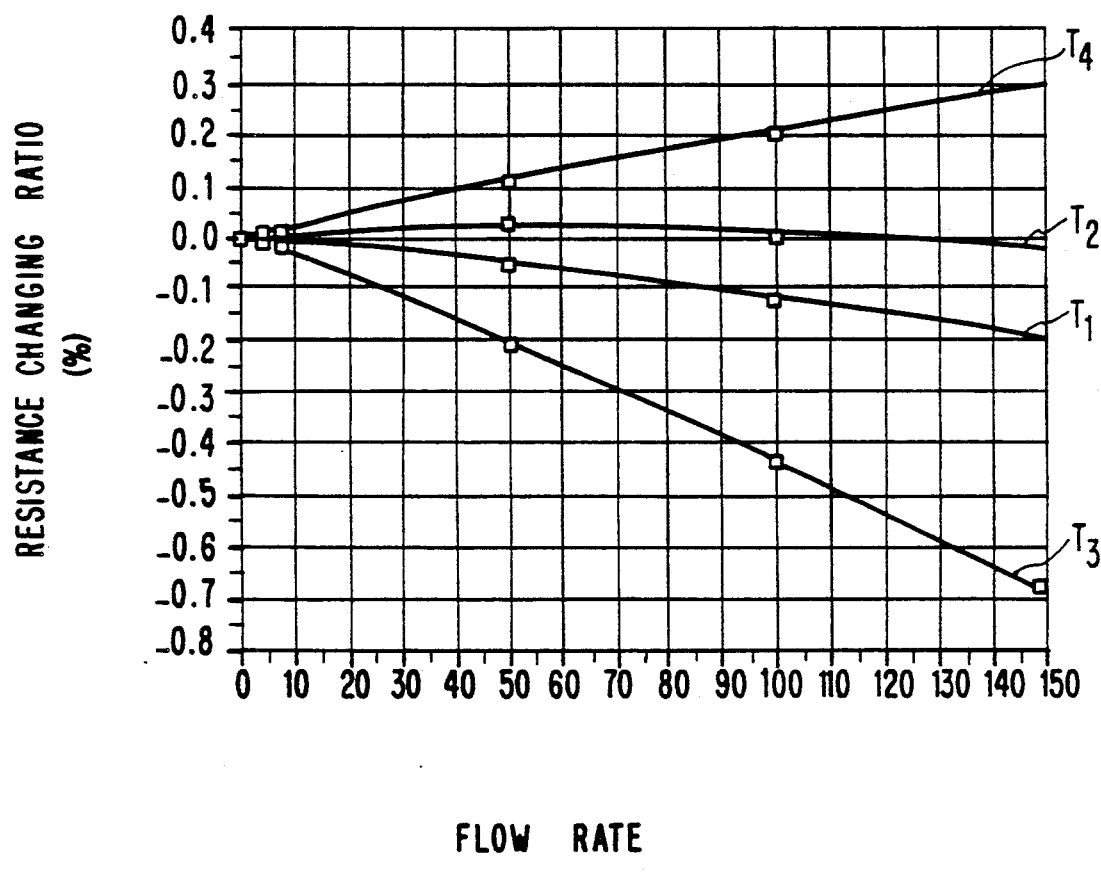
FIG. 3 is a graph showing experimental data of the resistance changing ratio of the upstream and downstream temperature sensors with respect to changes in flow rates.

FIG. 3 shows the relationship between the flow rate and the resistance changing ratio of the upstream and downstream temperature sensors $R_U$, $R_D$, obtained by experiments. A line $t_1$ shows the resistance changing ratio of the upstream temperature sensor $R_U$ with the heater $R_H$ turned off, a line $t_2$ the resistance changing ratio of the downstream temperature sensor $R_D$ with the heater $R_H$ turned off, a line $t_3$ the resistance changing ratio of the upstream temperature sensor $R_U$ with the heater $R_H$ turned on, and $t_4$ the the resistance changing ratio of the downstream temperature sensor $R_D$ with the heater $R_H$ turned on.

Figure 4:
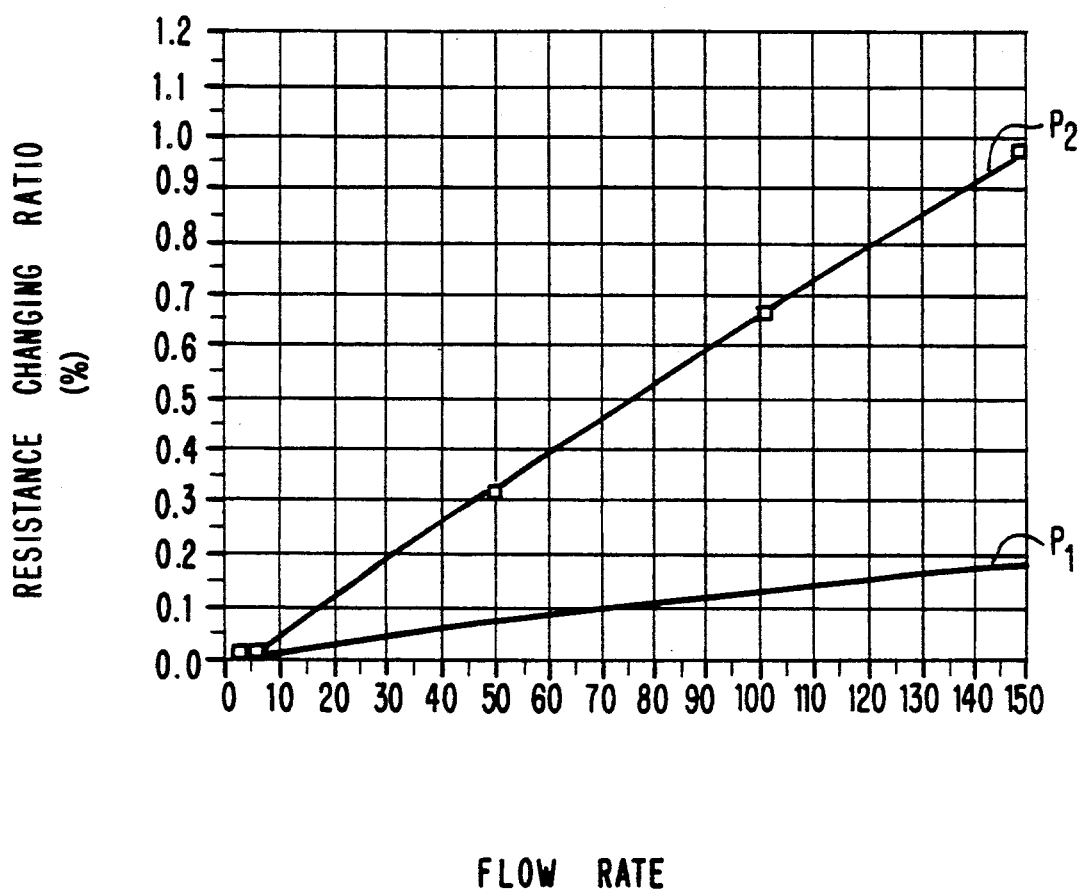
FIG. 4 is a graph showing the difference in the resistance changing ratio between the upstream and downstream temperature sensors, based on the graph of FIG. 3.

FIG. 4 is a graph which plots the difference in the resistance changing ratio between the upstream and downstream temperature sensors $R_U$, $R_D$, based on the graphs of FIG. 3. A characteristic curve $P_1$ in heater-off condition corresponds to the bridge output $V_{B1}$, while a characteristic curve $P_2$ in heater-on condition corresponds to the bridge output $V_{B2}$.

As explained above, the upstream and downstream temperature sensors $R_U$, $R_D$ are applied with the currents $I_{U1}$, $I_{D1}$, respectively, when the heater $R_H$ is off. These currents $I_{U1}$, $I_{D1}$ cause the respective temperature sensors $R_U$, $R_D$ to be heated, which leads to change the resistance value thereof. However, such changing ratio is relatively low, compared with the resistance changing ratio when the heater $R_H$ is on. Therefore, if $V_{B2} - V_{B1}$ is calculated when a flow exists, the output will be reduced by approximately 20%, compared with the bridge output $V_{B2}$. Such reduction, however, can be compensated for by a signal processing effected by a rear stage circuit, thereby incurring no problem.

Figure 1:
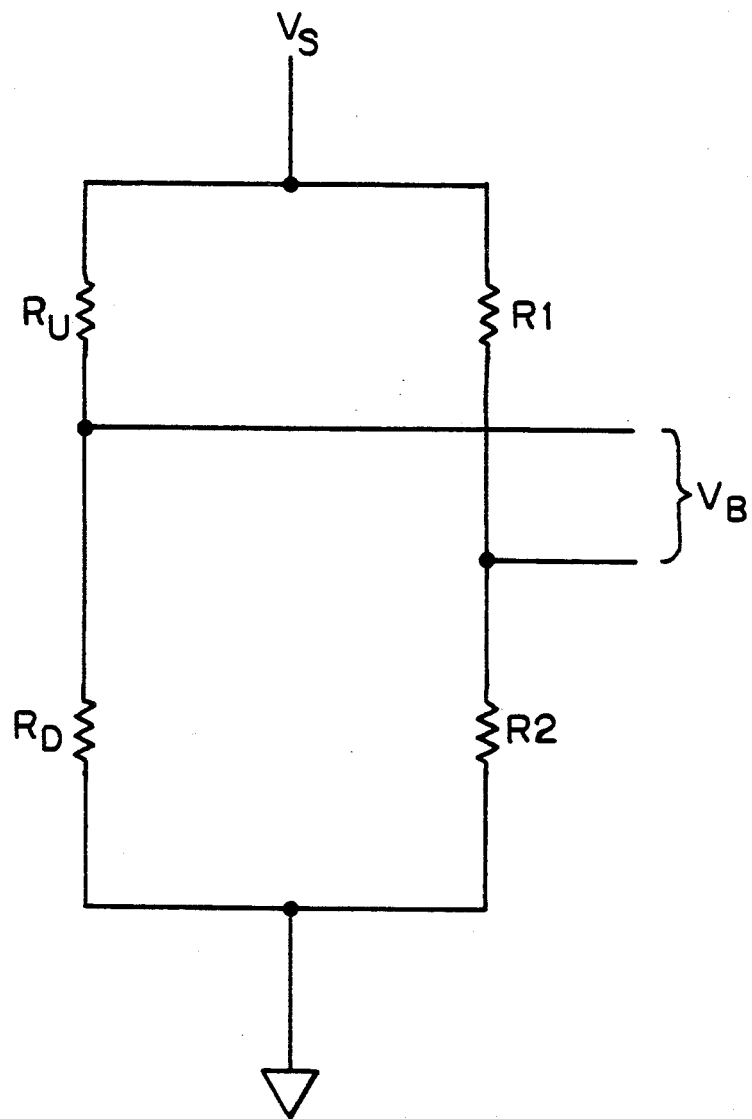
FIG. 1 is a schematic circuit diagram of a bridge arrangement.
Figure 5:
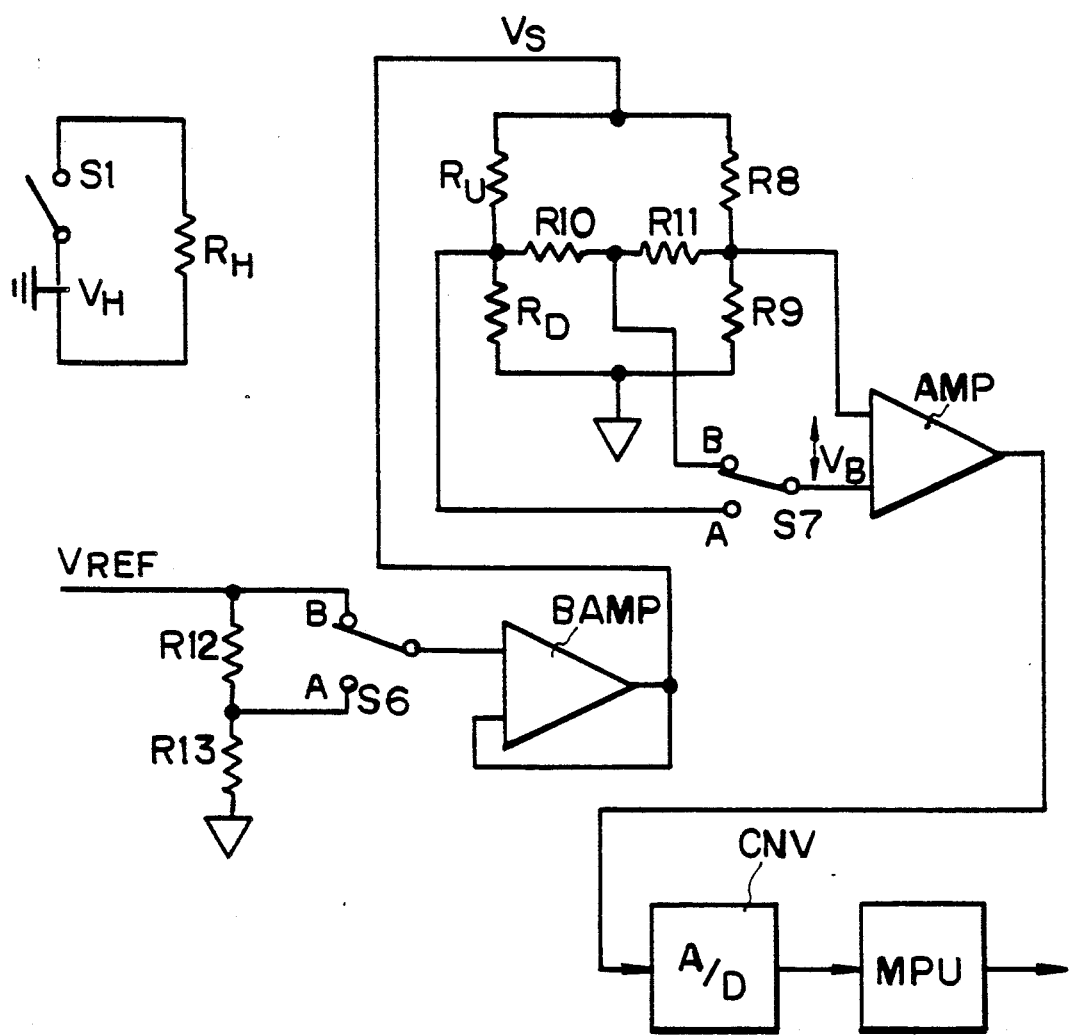
FIG. 5 is a circuit diagram showing another embodiment of a zero point compensating circuit according to the present invention.

FIG. 5 shows a circuit arrangement of another flow meter in which the method of compensating for a zero point of the present invention is embodied. In the drawing, the parts corresponding to those in FIG. 1 are designated the same reference numerals and detailed explanation thereof will be omitted.

In the present embodiment, the upstream and downstream temperature sensors $R_U$, $R_D$ are connected in series. The resistance values of resistors R10, R11, forming an attenuator, are chosen to be sufficiently larger than those of the upstream and downstream temperature sensors $R_U$, $R_D$ and resistors R8, R9. The resistors R8, R9 are identical. A reference voltage $V_{REF}$, which is applied to a buffer amplifier BAMP when a switch S6 is connected to a contact B (the heater·$R_H$ is turned off), is determined such that the upstream and downstream temperature sensors $R_U$, $R_D$ are supplied, in heater-off condition, with currents which respectively heat the upstream and downstream temperature sensors $R_U$, $R_D$ to the same temperature to which they are heated by the heater $R_H$ being on.

The resistors R10–R13 satisfy the following relationship:

$$\frac{R11}{R10 + R11} = \frac{R13}{R12 + R13}$$

In the flow meter constructed as described above, the bridge output $V_{B1}$ when the heater $R_H$ is off is expressed by the following expression:

$$V_{B1} = \frac{R11}{R10 + R11} \cdot \left[ \frac{R_{D1}}{R_{U1} + R_{D1}} - \frac{R9}{R8 + R9} \right] \cdot V_{S1}$$

where $V_{S1} = V_{REF}$.

Also, the bridge output $V_{B2}$ when the heater RH is on is expressed by the following expression:

$$V_{B2} = \left[ \frac{R_{D2}}{R_{U2} + R_{D2}} - \frac{R9}{R8 + R9} \right] \cdot V_{S2}$$

Now, assume that $\alpha U \neq \alpha D$ and $R_{UO} \neq R_{DO}$ stand in this condition the offset, i.e. $V_{B2} - V_{B1}$ is calculated. When there is no flow, $R_{U1}$, $R_{D1}$, $R_{U2}$ and $R_{D2}$ are, as mentioned above, given by:

$$R_{U1} = R_{U0} \cdot (1 + \alpha_U \cdot T1)$$
$$R_{D1} = R_{D0} \cdot (1 + \alpha_D \cdot T1)$$
$$R_{U2} = R_{U0} \cdot (1 + \alpha_U \cdot T2)$$
$$R_{D2} = R_{D0} \cdot (1 + \alpha_D \cdot T2)$$

Therefore, $V_{B2}-V_{B1}$ is calculated as follows:
$V_{B2}-V_{B1}$ $$V_{B2} - V_{B1} = \left( \frac{R_{D2}}{R_{Us} + R_{D2}} - \frac{R9}{R8 + R9} \right).$$

$$V_{S2} - \frac{R11}{R10 + R11} \cdot \left( \frac{R_{D1}}{R_{U1} + R_{D1}} - \frac{R9}{R8 + R9} \right).$$

$$V_{S1} = \left[ \frac{R_{D0} \cdot (1 + a_D \cdot T2)}{R_{U0} \cdot (1 + a_U \cdot T2) + R_{D0} \cdot (1 + a_D \cdot T2)} - \frac{1}{2} \right].$$

$$\frac{R13}{R12 + R13} \cdot V_{REF} - \frac{R11}{R10 + R11} \cdot$$

$$\left[ \frac{R_{D0} \cdot (1 + a_D \cdot T1)}{R_{U0} \cdot (1 + a_U \cdot T1) + R_{D0} \cdot (1 + a_D \cdot T1)} - \frac{1}{2} \right].$$

$$V_{REF} = \left[ \frac{R_{D0} \cdot (1 + a_D \cdot T2)}{R_{U0} \cdot (1 + a_U \cdot T2) + R_{D0} \cdot (1 + a_D \cdot T2)} - \right.$$

$$\left. \frac{R_{D0} \cdot (1 + a_D \cdot T1)}{R_{U0} \cdot (1 + a_U \cdot T1) + R_{D0} \cdot (1 + a_D \cdot T1)} \right].$$

$$\frac{R13}{R12 + R13} \cdot V_{REF} = \frac{N1}{N2} \cdot \frac{R13}{R12 + R13} \cdot V_{REF}$$

where $$N1 = R_{DC} \cdot (1 + a_D \cdot T2) \cdot R_{U0} \cdot (1 + a_U \cdot T1) -$$
$$R_{D0} \cdot (1 + a_D \cdot T1) \cdot R_{U0} \cdot (1 + a_U \cdot T2);$$

and $$N2 = [R_{UC} \cdot (1 + a_U \cdot T2) + R_{D0} \cdot (1 + a_D \cdot T2)] \cdot$$
$$[R_{U0} \cdot (1 + a_U \cdot T1) + R_{D0} \cdot (1 + a_D \cdot T1)]$$

In the above expression, if T1 is equal to T2, N1 becomes zero, and consequently $V_{B2}-V_{B1}=0$ is satisfied, thus removing the offset occurring in the bridge output $V_{B2}$.

As is apparent from the above description, the zero point compensating method of the present invention applies the upstream and downstream temperature sensors with an increased amount of current when the heater is off, so as to generate heat in the temperature sensors and accordingly elevate temperatures thereof. The bridge output thus compensated by the additional current applied to the temperature sensors in heater-off condition is subtracted from the bridge output in heater-on condition.

The upstream and downstream temperature sensors are applied with the increased current so as to be at the same temperature irrespective of the heater $R_H$ being on or off when there is no flow. Therefore, even if the resistance value and thermal coefficients of resistance (TCR) of the upstream and downstream temperature sensors are not equal, it is ensured that the offset is removed, thereby making it possible to achieve a precise measurement of small flow rates of a fluid of interest.

Since many changes could be made in the above construction and many apparently widely differing embodiments of the present invention could be made without departing from the scope thereof, it is intended that all matters contained in the above description or shown in the accompanying drawings shall be interpreted as illustrative and not in a limiting sense.

What is claimed is:

1. A zero point compensating circuit for a flow meter of a type including an upstream thermal sensor means, a downstream thermal sensor means and a heater means located between said upstream and downstream thermal sensor means, said upstream and downstream thermal sensor means constituting a bridge circuit, and said flow meter measuring flow rates of a fluid of interest based on bridge outputs derived by the difference in temperatures sensed by said upstream and downstream thermal sensor means, said zero point compensating circuit comprising:
   a first switch means coupled to said heater means for turning on and off said heater means; and
   a current supply means coupled to said upstream and downstream thermal sensor means for selectively supplying said upstream and downstream thermal sensor means with a first current when said first switching means is closed and a second current larger than said first current when said first switching means is opened such that second current heats said upstream and downstream thermal sensor means to a temperature when said heater is off which is the same temperature they reach when they are heated when said heater is on in no flow condition.

2. A zero point compensating circuit according to claim 1, wherein said current supply means comprises:
   a voltage supply means;
   a plurality of resistor means coupled to said voltage supply means; and
   a second switch means coupled to said resistor means and operative to be closed when said first switch means is open and opened when said first switch means is closed for changing combination of said resistor means.

3. A zero point compensating circuit according to claim 1, wherein said current supply means comprises:
   a voltage supply means;
   a voltage dividing means coupled to said voltage supply means;
   a third switch means coupled to said voltage dividing means for changing over said voltage dividing means; and
   a buffer means coupled to said third switching means for supplying a selectively desired current to said upstream and downstream thermal sensor means.

4. A zero point compensating circuit according to claim 1 further comprising microcomputer means for storing a compensating bridge output generated when said second current is applied to said upstream and downstream thermal sensor means and subtracting said compensating bridge output from each of bridge outputs respectively indicative of flow rates.

* * * * *